United States Patent [19]
Lee et al.

[11] Patent Number: 5,633,793
[45] Date of Patent: May 27, 1997

[54] SOFT SWITCHED THREE-PHASE BOOST RECTIFIERS AND VOLTAGE SOURCE INVERTERS

[75] Inventors: Fred C. Lee, Blacksburg, Va.; Yimin Jiang, Plano, Tex.

[73] Assignees: Center for Innovative Technology, Herndon; Virginia Tech Intellectual Properties, Inc.; Virginia Polytechnic Institute and State University, both of Blacksburg, all of Va.

[21] Appl. No.: 376,365

[22] Filed: Jan. 23, 1995

[51] Int. Cl.⁶ .................... H02M 7/5387; H02M 7/217
[52] U.S. Cl. ............................. 363/127; 363/132
[58] Field of Search ................... 363/17, 37, 97, 363/98, 125, 127, 131, 132

[56] References Cited

U.S. PATENT DOCUMENTS

| | | | |
|---|---|---|---|
| 4,864,483 | 9/1989 | Divan | 363/37 |
| 5,255,175 | 10/1993 | Uchino | 363/127 |
| 5,291,388 | 3/1994 | Heinrich | 363/98 |
| 5,367,448 | 11/1994 | Carroll | 363/17 |
| 5,432,695 | 7/1995 | Vlatkovic et al. | 363/127 |

*Primary Examiner*—Matthew V. Nguyen
*Attorney, Agent, or Firm*—Whitham, Curtis Whitham & McGinn

[57] ABSTRACT

A boost rectifier is provided with an ultra high speed diode in its direct current rail to reduce diode reverse recovery loss with or without implementing a soft switching technique. Full zero-voltage-transition (ZVT) as well as zero-current-transition (ZCT) may also be achieved by adding a simple auxiliary network across the DC rail which operates only during the short turn-on transients of the bridge switches. Similarly, a simple, inexpensive auxiliary circuit can be added to the DC rail of a conventional voltage source inverter shown to implement both ZVT and ZCT.

6 Claims, 7 Drawing Sheets

SOFT SWITCHED THREE-PHASE BOOST RECTIFIERS AND VOLTAGE SOURCE INVERTERS

BACKGROUND OF THE INVENTION

1. Field of the Invention

The present invention generally relates to soft switched three-phase converters and, more particularly, to three-phase rectifiers and inverters having improvements made to the DC rail side of the converter for improving performance, reliability and power factor correction (PFC).

2. Description of the Prior Art

Conventional diode and thyristor bridge rectifiers create strong harmonic currents which can pollute public utility networks. In an effort to protect utility quality, legislation has been proposed limiting rectifier harmonic output current. As such, companies that manufacture power electronics equipment are constantly looking for new power factor correction (PFC) techniques, and ways to integrate PFC into their products. FIGS. 1 and 2 are examples of prior art converters which offer PFC. FIG. 1 is a three-phase boost rectifier ideal for high power applications which offers unity power factor with continuous input currents. Here, three a.c. phases, $V_a$, $V_b$, and $V_c$, are passed through a bridge switching network and over a smoothing capacitor $C_o$ to supply a d.c. load. On the opposite end of the spectrum, FIG. 2 shows a prior art three-phase voltage source inverter. Here, a d.c. voltage source $V_{in}$ is transformed by a bridge switching network into three-phase a.c. currents, $i_a$, $i_b$, and $i_c$. This type of inverter is widely used in motor drives and Uninterrupted Power Supply (UPS) systems.

For both the rectifier in FIG. 1 and the inverter in FIG. 2, if no soft-switching technique is applied, the six bridge anti-parallel diodes will cause a severe reverse recovery problem due to a high DC rail voltage. For high power applications minority carrier switching devices, such as BJTs, IGBTs, GTOs are often used, which have severe turn-off current tail problem which further exacerbate switching losses and degrade the power factor. As a result, it is extremely difficult to operate such converters at a high switch frequencies (i.e. 20 KHz or higher) without implementing soft-switching technique.

A lot of research has been spent on improving the prior art rectifier and inverter circuits, the major thrust being on pulse width modulation (PWM) strategies. Though many useful soft-switching PWM strategies have been developed, none are completely satisfactory. The most advanced available soft-switching techniques are the resonant DC link, the quasi-resonant DC link, and the space-vector based zero-voltage transition. The major drawback of the resonant DC link technique is that the resonant components appear in the main power path and the resonance increases the voltage or current stresses of the switches. The quasi resonant DC link technique requires more complicated control and produces more circulating energy causing high conduction losses. The space-vector based zero-voltage transition technique can only be implemented with high speed digital signal processor and requires many auxiliary components. Additionally, all these techniques are only about zero-voltage switching. Until now, a suitable zero-current switching technique has not been developed.

SUMMARY OF THE INVENTION

It is therefore an object of the present invention to provide to provide simpler and more effective soft-switching techniques for three-phase converters.

It is yet another object of the present invention to provide simple modifications to the DC rail of a boost rectifier which permits zero-voltage-transition (ZVT) and zero-current-transition (ZCT).

It is yet another object of the present invention to provide simple modifications to the DC rail of a voltage source inverter which permits zero-current-transition (ZCT) and zero-voltage-transition (ZVT).

These and other objects of the present invention are accomplished by adding relatively simple, inexpensive components to the DC rails of conventional converter circuits. For a boost rectifier, an ultra high speed diode, about an order of magnitude faster than the anti-parallel switching diodes, is inserted in the DC rail after the switching network. The reverse recovery current is thereby determined only by this diode and, consequently, much less reverse recovery loss is expected even with a hard switching technique. Zero-current-transition (ZCT) as well as Zero-voltage-transition (ZVT) may also be achieved by adding a simple auxiliary network across the DC rail which operates only during the short turn-on or turn-off transients of the bridge switches. Similarly, a simple, inexpensive auxiliary circuit is added to the DC rail of a conventional voltage source inverter shown in FIG. 2 to implement either ZVT and ZCT.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
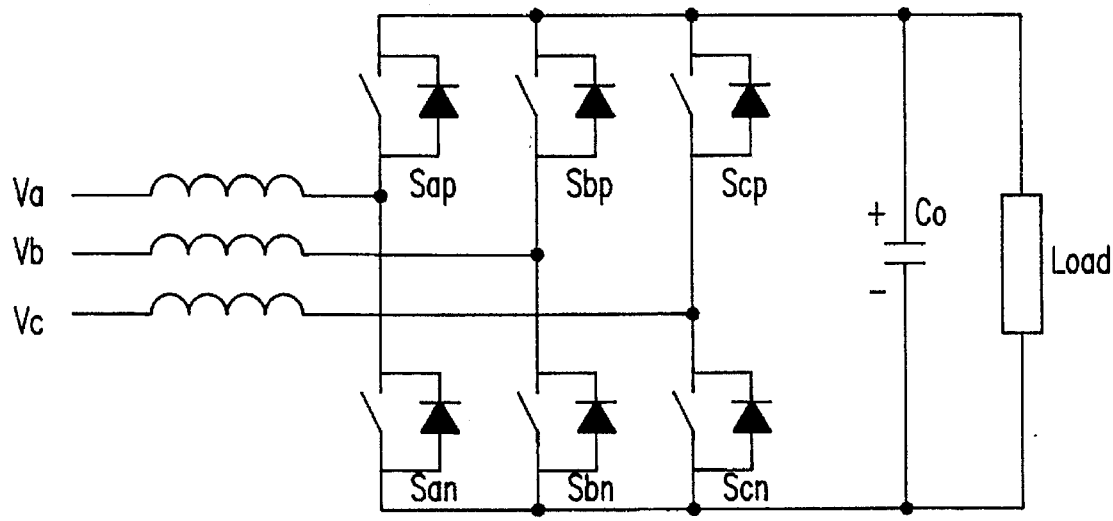
FIG. 1 is a prior art three-phase boost rectifier.
Figure 2:
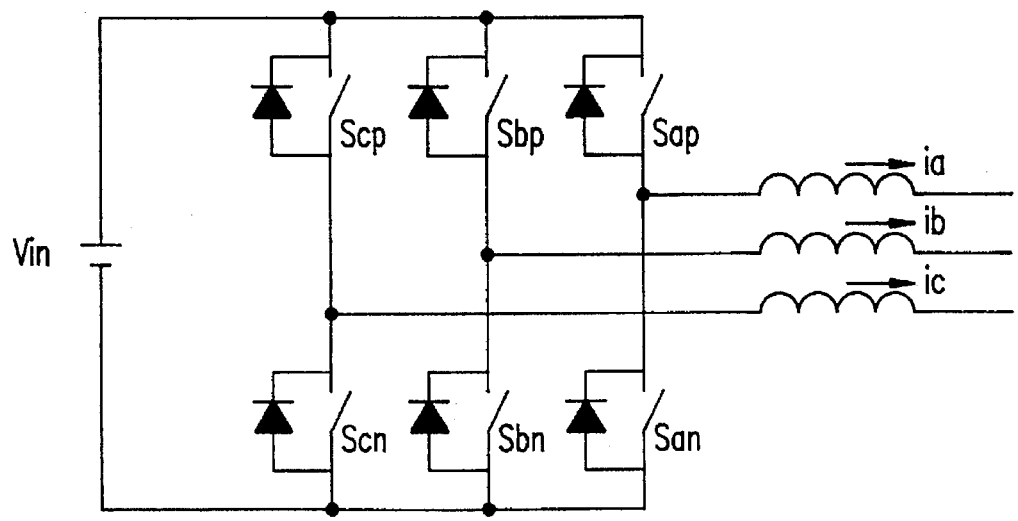
FIG. 2 is a prior art three-phase voltage source inverter.
Figure 3:
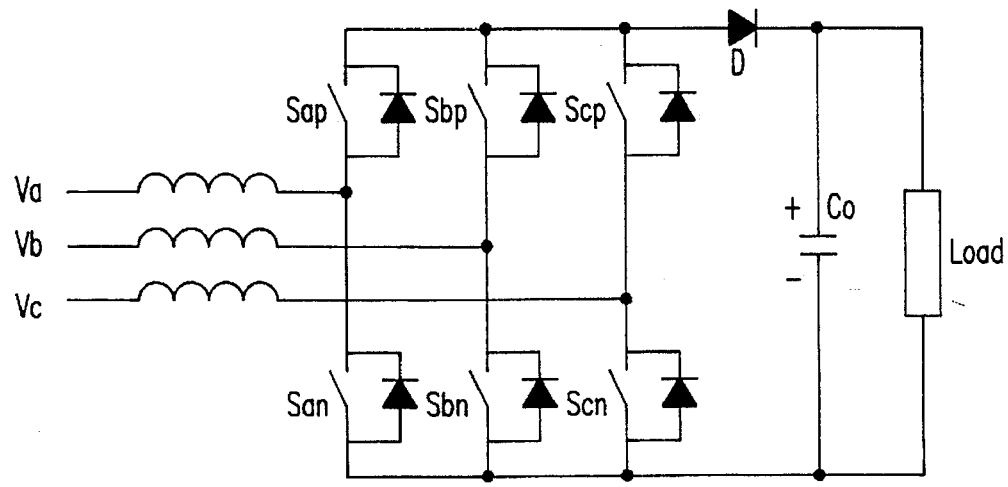
FIG. 3 is an improved three phase boost rectifier according to the present invention for reducing diode reverse recovery loss.

Referring now to the drawings, and more particularly to FIG. 3, there is shown three-phase boost rectifier according to the present invention. The rectifier is similar to the rectifier shown in FIG. 1 having a three-phase input, $v_a$, $v_b$, and $v_c$, and a bridge switching network comprised of six bridge switches, $S_{ap}$, $S_{an}$, $S_{bp}$, $S_{bn}$, $S_{cp}$, and $S_{cn}$, hereinafter collectively referred to as simply S. Each bridge switch S has an anti-parallel diode associated therewith. It is understood that these anti-parallel diodes may be either discrete components or the body diode in the case of an active switch such as a MOSFET. According to the invention, an ultra fast diode D is introduced in the d.c. rail prior to a smoothing capacitor $C_o$ supplying a d.c. load. The introduction of the ultra-fast diode D alleviates diode reverse recovery experienced by the diodes in the switching bridge as well as facilitates soft-switching. In the prior art three-phase boost rectifier shown in FIG. 1, at the moment the active switches S (one in each phase) are turned on, any previously conducting anti-parallel diodes will see a high output voltage as:

$$V_o \geq V_{line\,peak} \cdot \frac{3}{\pi}$$

This high voltage creates a very high reverse recovery current spike in the much slower anti-parallel bridge diodes which in turn causes significant turn-on losses. The ultra fast diode D, which is chosen to be much faster (for example, ten times faster) than the bridge diodes, now determines the reverse recovery current. Consequently, a large reduction in turn-on loss, improved power factor, and a significant increase in the switching frequency is experienced even without implementing a soft-switching technique. However, it is noted that greater advantages can be realized if a soft switching technique is employed in addition. For example, zero-voltage-switching techniques can completely solve the diode reverse recovery problem and remove capacitive turn-on losses. Zero-current-switching techniques can eliminate the turn-off losses of IGBT, GTO, etc. Consequently, if soft-switching is also employed the switching frequency can be pushed much higher. This give rise to significant savings of filter inductor size and the circuit cost.

Figure 4:
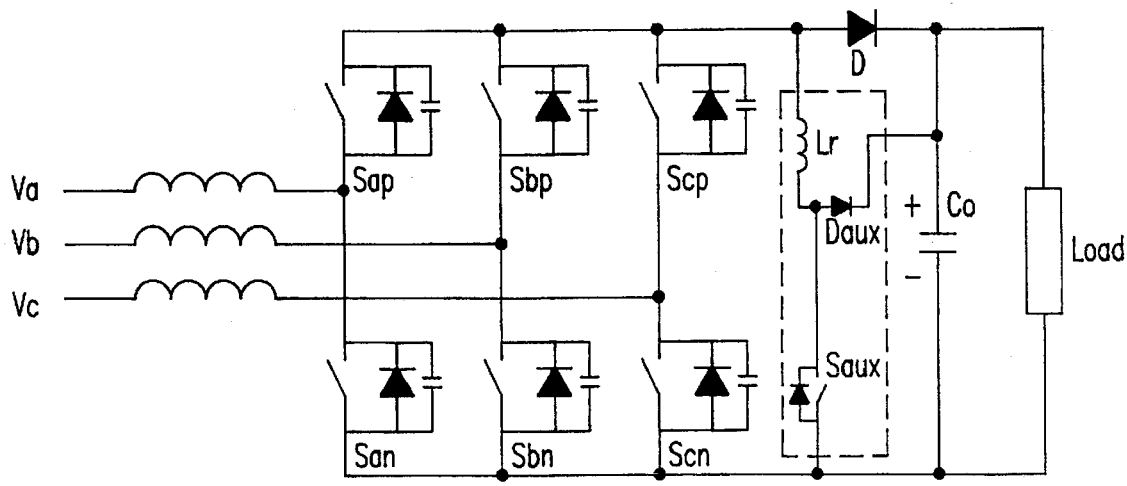
FIG. 4 is a three phase boost rectifier according to the present invention for achieving ZVT.
Figure 5:
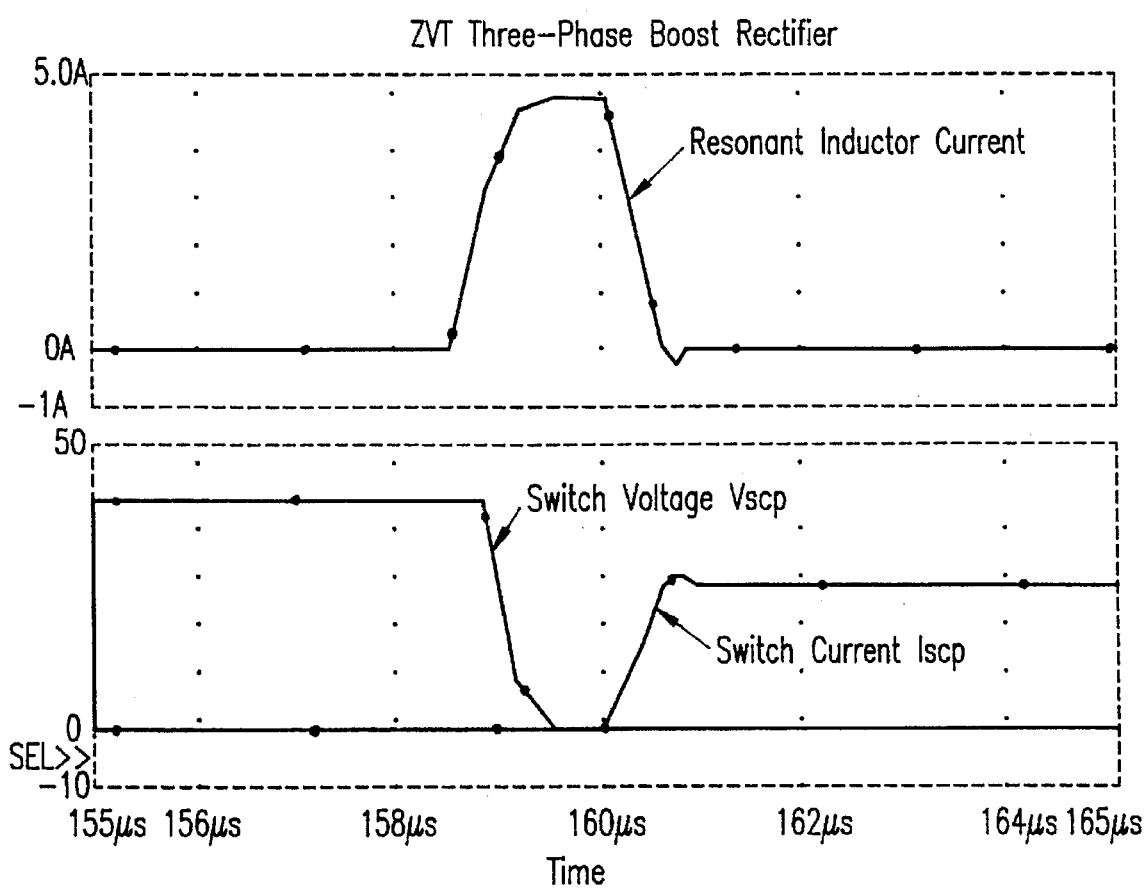
FIG. 5 is a computer generated simulation of the operation of the ZVT rectifier shown in FIG. 4.

Referring now to FIG. 4, using the DC rail diode D shown FIG. 3, it possible to implement zero-voltage-transition ZVT in by adding only one simple auxiliary network on the DC side. The proposed ZVT three-phase boost rectifier is shown in FIG. 4, where the auxiliary network consists of resonant inductor $L_r$, auxiliary switch $S_{aux}$, and diode $D_{aux}$. The auxiliary network only operates during the short turn-on transients of the bridge switches. It is preferred that the bridge switches S are synchronized at their turn-on instants so that the auxiliary ZVT network only operates once per switching cycle. In operation, the auxiliary switch $S_{aux}$ is turned on a short period before the turn-on of the bridge switches S. Therefore, a current builds up in inductor $L_r$. Once the current in $L_r$ reaches the highest input phase current, resonance begins between $L_r$ and bridge capacitances. This resonance will bring the bridge voltage down to zero thus achieving a ZVS condition for the bridge switches S. FIG. 5 shows a computer generated simulation to verify the ZVT operation. The simulation shows one turn-on transient happens at t=160 μs. Since, the switch voltage drops down to zero before its current starts to rise, no turn-on loss occurs.

Figure 6:
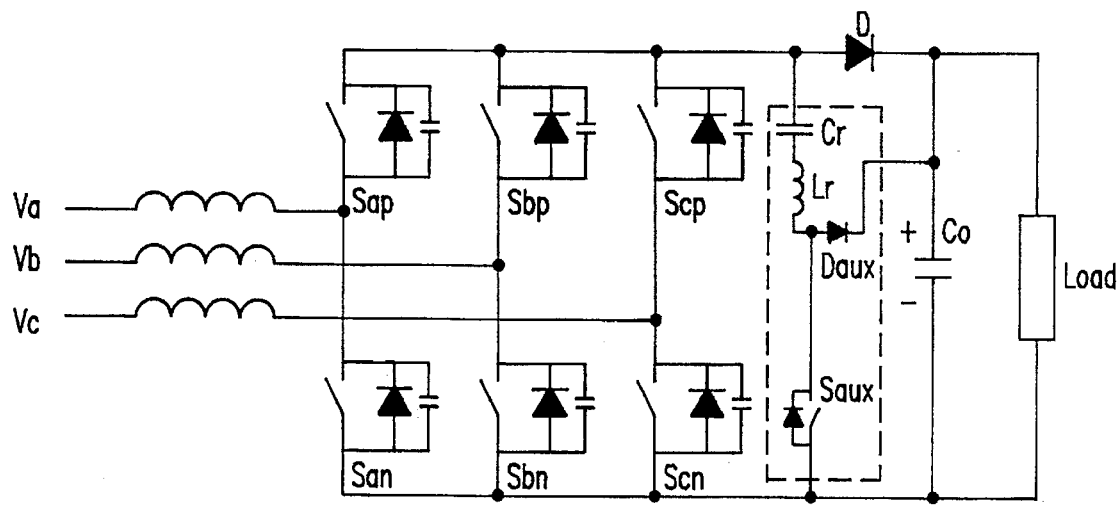
FIG. 6 is a ZCT three-phase boost rectifier according to the present invention.
Figure 7:
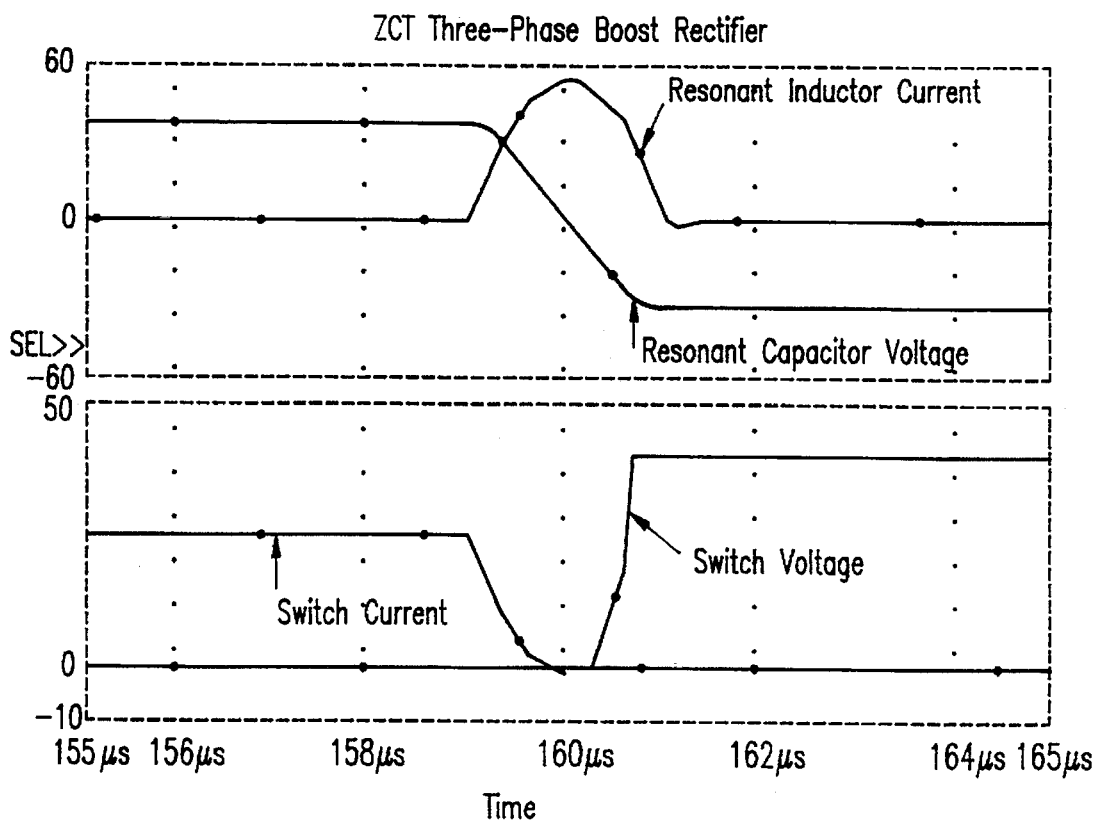
FIG. 7 is a computer generated simulation of the operation of the ZCT rectifier shown in FIG. 6.

Referring now to FIG. 6, there is shown a ZCT three-phase boost rectifier having an auxiliary network which consists of resonant inductor $L_r$, resonant capacitor $C_r$, auxiliary switch $S_{aux}$, and auxiliary diode $D_{aux}$. The auxiliary network is similar to the network shown in FIG. 4 with the addition of the resonant capacitor $C_r$. The ZCT network only operates during the short turn-off transients of the bridge switches S. Again, it is preferred that the bridge switches S are synchronized at their turn-off instants so that the auxiliary ZCT network only operates once per switching cycle. In operation, the auxiliary switch $S_{aux}$ is turned on for a short period before the turn-off of the bridge switches S. A current builds up in $L_r$ as a result of the resonance between $L_r$ and $C_r$ due to the initial voltage on $C_r$. Once the current in $C_r$ reaches the highest input phase current, all three phase currents only flow through bridge diodes and no current is left in any bridge switch. Hence, a ZCT turn-off condition is achieved for the bridge switches S. FIG. 7 shows a simulation of the ZCT operation for a turn-on transient at t=160 μs. It is noted that there is no overlap between the switch voltage and the switch current indicating no turn-off losses.

All of the boost rectifier circuits of the present invention implement the novel DC rail diode D which has been found to naturally provide a six-step PWM operation which, in prior art circuits not having such a diode, requires a more complicated control circuitry. Briefly, six-step PWM refers to using six optimal bridge voltage vector combinations in a line cycle of 360°, one for each 60°. An optimal bridge voltage vector combination is the zero vector and the two bridge voltage vectors closest to the input voltage vector. Under six-step PWM, the boost inductors are only charged with the input voltage vector (zero-vector), which produces the minimum input current ripple as compared to other PWM schemes which allow the output voltage to participate in charging the boost inductor. Six-step PWM operation is inherent to the present invention because the DC rail diode D prevents the output voltage from participating in the boost inductor charging process. Consequently, undesired vectors are eliminated and the boost inductor current ripple is minimized automatically. In addition to above benefits from this DC rail diode D, another significant advantage is that it eliminates the possibility of shoot-through current from occurring even when both switches S on the same leg or phase of the switching bridge are conducting. Shoot through refers to the output capacitor in a conventional boost rectifier being shorted once both switches on the same leg are conducting. With the DC rail diode of the present invention, this shorting path is eliminated thus providing higher reliability than the conventional circuits.

Figure 8:
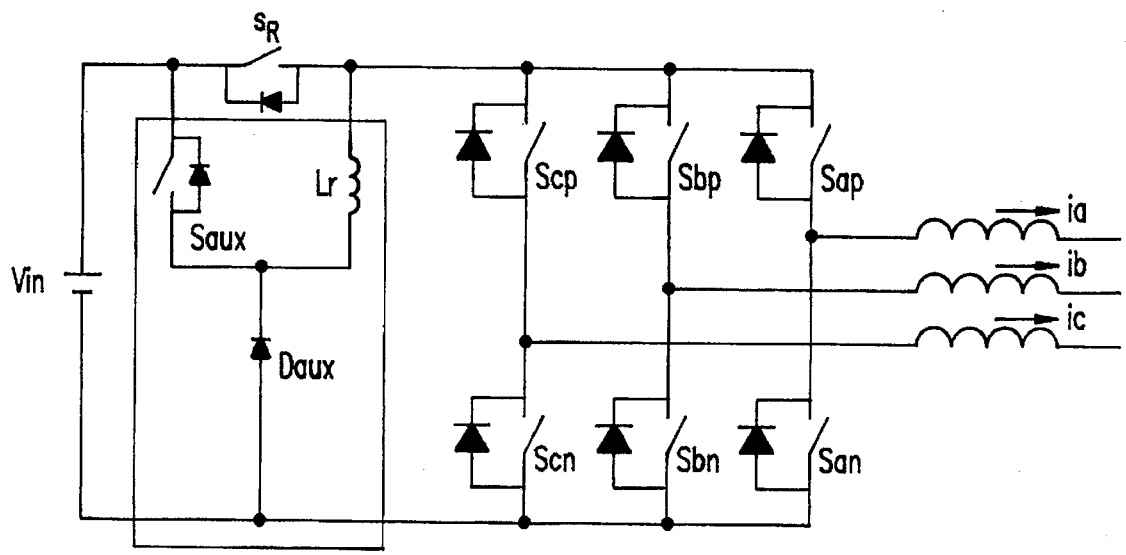
FIG. 8 is a ZVT voltage source converter according to the present invention.

Similar to the above discussed rectifiers, ZVT and ZCT can be also implemented in a voltage source inverter by adding an active switch on the DC rail side. Referring now to FIG. 8, there is shown a soft switching ZVT voltage source inverter according to the present invention. Although a 20 KHz inverter switching frequency, not necessarily requiring soft-switching, is fast enough for most motor drive systems to avoid the acoustic noise, soft-switching is still preferred. First, 20 KHz is hard to attain for hard-switching high power circuits with currently available devices. Second, for uninterrupted power supply (UPS) systems there is always a demand to reduce the filter inductor size by increasing the switching frequency. Third, for bi-directional power flow applications, the off-line rectifier should be able to run as an inverter during regeneration (i.e. operate in reverse as an inverter).

Figure 9:
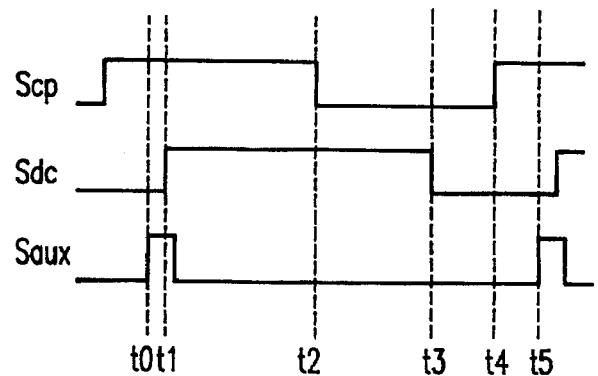
FIG. 9 is a diagram of control waveforms for the ZVT voltage source converter shown in FIG. 8 for $i_a<0$ and $i_b>i_c>0$.
Figure 10:
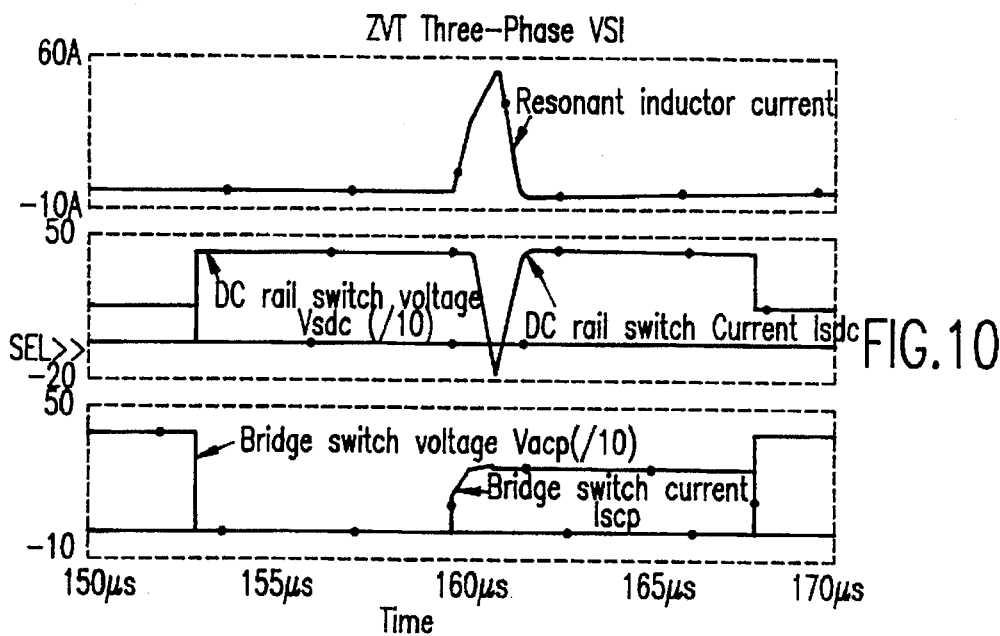
FIG. 10 is a computer simulation of a the ZVT voltage source inverter shown in FIG. 8.

In operation, the inverter shown in FIG. 8 the bridge switches are turned on (i.e by applying gate drive control signals) while the DC rail switch $S_R$ is off so that the switches are under zero voltage turn-on condition. Then, the DC rail switch $S_R$ is turned on aided by the ZVT network composed of $L_r$, $S_{aux}$, and $D_{aux}$. An example of the operation is demonstrated in FIG. 9 for the case of $i_a<0$ and $i_c>i_b>0$. In such case with synchronized turn-on scheme, the bridge switches S to be turned on at the beginning of each switching cycle should be $S_{an}$, $S_{bp}$, and $S_{cp}$. In fact, due to the existence of the DC rail switch, a very simple PWM scheme can be used which only operates one bridge switch and the DC rail switch $S_R$. This leaves $S_{an}$ and $S_{bp}$ on all the time and only switching $S_{cp}$ and $S_R$ to obtain the output current control. In this way, the DC rail voltage is kept at zero during the freewheeling state at the end of every switching cycle and thus provides the zero-voltage turn-on condition for $S_{cp}$ at the beginning of the next switching cycle. In FIG. 9, $S_{cp}$ is gated earlier than $S_R$ so that it is turned on under zero-voltage condition, which does not change the circuit freewheeling state. At $t_0$, the auxiliary switch $S_{aux}$ is turned on to build a current in the resonant inductor $L_r$. The resonant inductor $L_r$ resonates with capacitances across the bridge switches and the DC rail switch $S_R$ to provide zero-voltage transition for the turn-on of $S_R$ at $t_1$. Times $t_2$ and $t_3$ are determined by the current control loops. $S_{cp}$ is turned on any time after $S_{dc}$ is turned off. At $t_5$, another switching cycle starts. Simulation has been done to verify the ZVT operation. The results are given in FIG. 10 which clearly show the zero-voltage turn-on of the bridge switches and the DC rail switch at t=160 μs.

Figure 11:
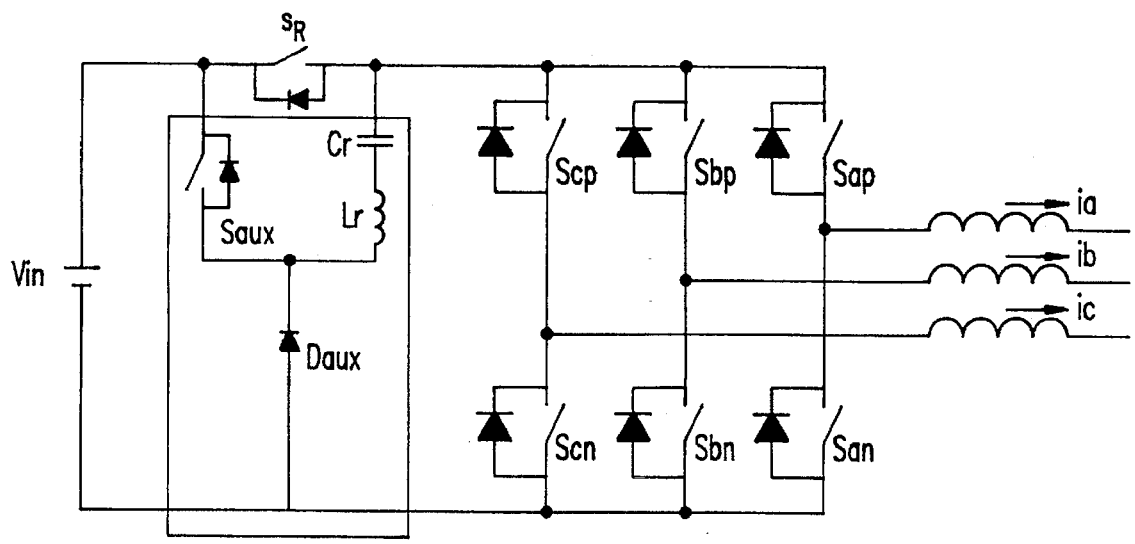
FIG. 11 is a is a ZCT voltage source inverter according to the present invention.
Figure 12:
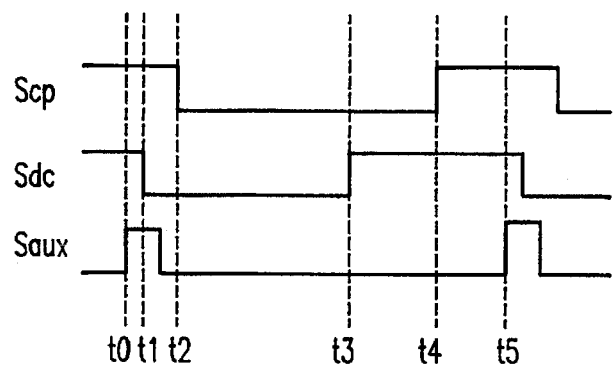
FIG. 12 is a diagram of control waveforms for the ZCT voltage source inverter shown in FIG. 8 for $i_a<0$ and $i_c>i_b>0$.
Figure 13:
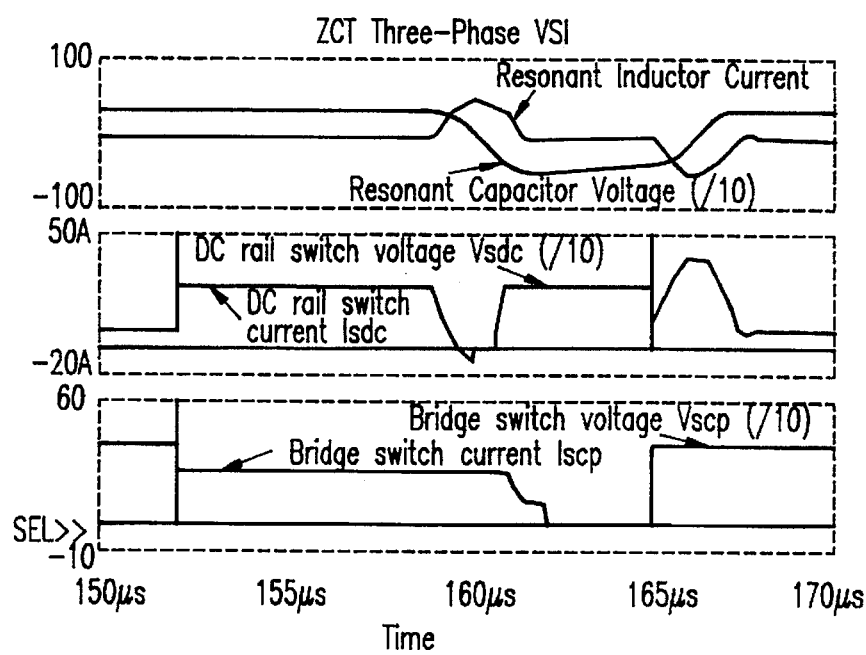
FIG. 13 is a computer generated simulation of the ZCT operation of the ZCT voltage source inverter shown in FIG. 11.

Referring now to FIG. 11, there is shown a zero-current-transition (ZCT) voltage source inverter. The operation principle is that the DC rail switch S is turned off first with the help of the ZCT network composed of $L_r$, $C_r$, $D_{aux}$, and $S_{aux}$. The drive signals of the bridge switches are removed after the turn-off of the DC rail switch S so that they are under zero voltage turn-off condition. Hence, no voltage applied on the switches after they are turned off. One example is shown in FIG. 12 which is the same example case used above to explain the ZVT voltage-source-inverter. However, different from the ZVT voltage-source-inverter, the turn-off instants are synchronized. Only one bridge switch $S_{cp}$ and the DC switch S are running under the given condition with $S_{an}$ and $S_{bp}$ on all the time. The control waveforms of FIG. 12 show $S_{aux}$ gated at $t_0$ to provide zero-current transition for the turn-off of S at $t_1$. After S is turned off, the DC link voltage drops down to zero, thus, $S_{cp}$ can be turned off at $t_2$ without seeing voltage. $t_3$ and $t_4$ are determined by the current control loops. At $t_5$, another switching cycle starts. Simulation has been done to verify the ZCT operation. The results are given in FIG. 13. It is noted that there is no overlap between the switch voltage and the switch current for bridge switches or the DC rail switch.

The introduction of the DC rail diode D imposes an undesirable limitation in that the power can flow only in one direction. However, there are many applications for which this is not an issue such as telecommunication systems and computer systems. Although the circuits embodied in FIGS. 8 and 11 do not provide soft-switching for the rectifier operation, if the anti-parallel diode of the DC rail switch $S_R$ is an ultra fast diode it would serve to alleviate reverse recovery of the anti-parallel bridge diodes. Thus, the above proposed circuit could also be able to deal with bi-directional power flow to certain extent.

Figure 14:
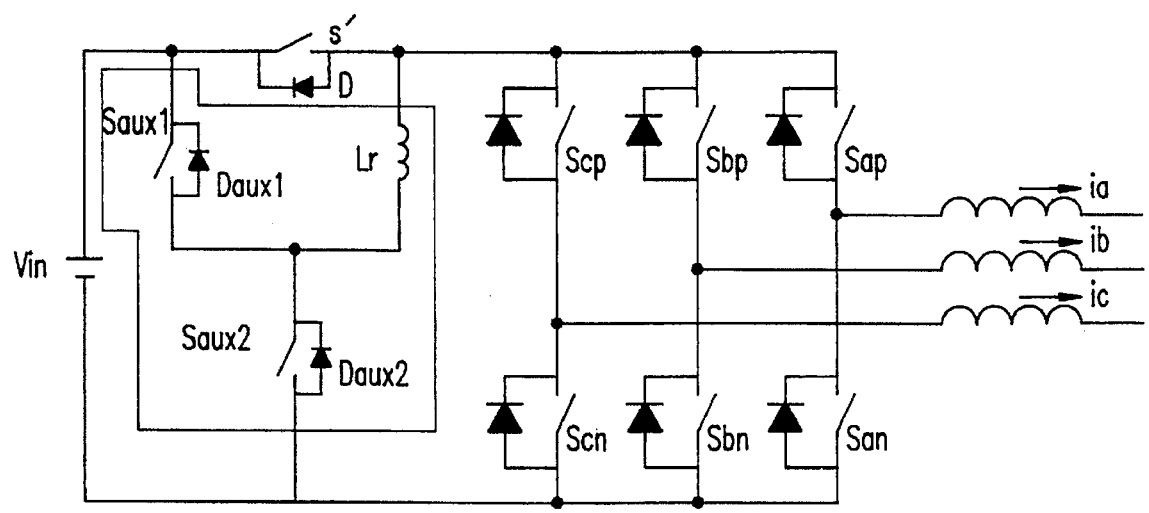
FIG. 14 is a bi-directional ZVT converter according to the present invention.
Figure 15:
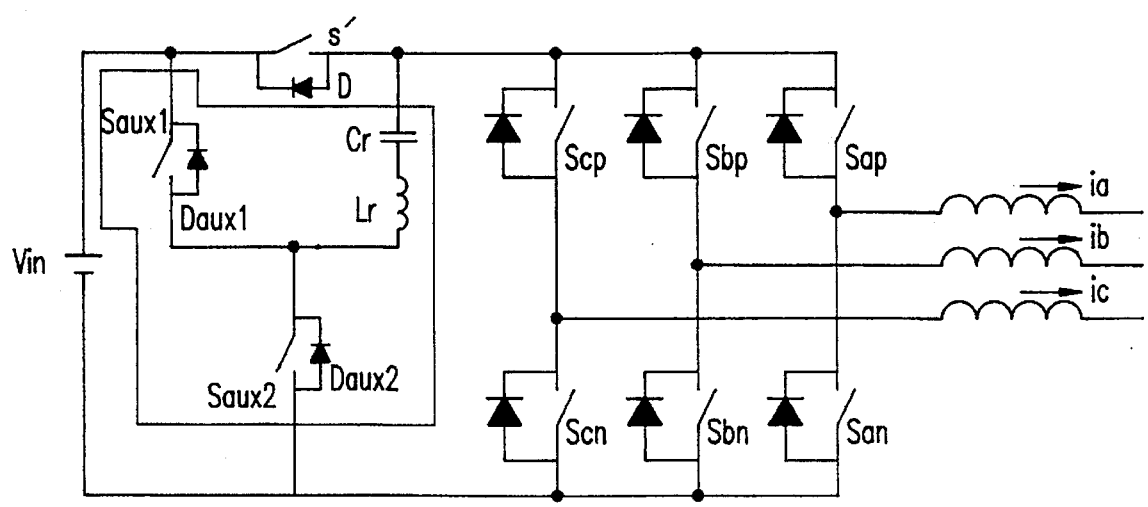
FIG. 15 is a bi-directional ZCT converter according to the present invention.

If soft-switching is necessary for bi-directional operation, the circuits shown in FIGS. 14 and 15 may be employed. FIG. 14 shows a bi-directional ZVT converter which is a hybrid of the boost rectifier shown in FIGS. 4 and the voltage source inverter shown in FIG. 8. It is noted that if the switch S' and switch $S_{aux1}$ are kept open the circuit is identical to the boost rectifier of FIG. 4. If, on the other hand, $S_{aux2}$ is open, the circuit becomes functionally equivalent to the voltage source inverter of FIG. 8.

Similarly, FIG. 15 shows a bi-directional ZCT voltage source inverter which is a hybrid of the boost rectifier shown in FIGS. 6 and the voltage source inverter shown in FIG. 11. If the switch S' and switch $S_{aux1}$ are kept open the circuit is identical to the boost rectifier of FIG. 6. If $S_{aux2}$ is open, the circuit becomes functionally equivalent to the voltage source inverter of FIG. 11. Hence, depending on the orientation of the switches S, $S_{aux1}$, and $S_{aux2}$, the circuits of FIGS. 14 and 15 can operate bi-directionally as either boost rectifiers or voltage source inverters.

While the invention has been described in terms of a single preferred embodiment, those skilled in the art will recognize that the invention can be practiced with modification within the spirit and scope of the appended claims.

We claim:

1. A three-phase boost rectifier for converting a three-phase alternating current power supply to a direct current power supply, comprising:

a three-phase alternating current power input;

a switching bridge connected between said alternating power input and a direct current rail output, said switching bridge comprising a plurality of switches each having an anti-parallel diode associated therewith;

a direct current rail diode connecting said switching bridge and said direct current rail output, said direct current rail diode being faster than said anti-parallel diodes; and an auxiliary circuit connected across said switching bridge for achieving zero-voltage-transition, said auxiliary circuit comprising:

a resonant inductor and an auxiliary diode connected in series across said direct current rail diode; and an auxiliary switch having a first pole connected between said resonant inductor and said auxiliary diode and a second pole connected to ground.

2. A three-phase boost rectifier for converting a three-phase alternating current power supply to a direct current power supply, comprising:

a three-phase alternating current power input;

a switching bridge connected between said alternating power input and a direct current rail output, said switching bridge comprising a plurality of switches each having an anti-parallel diode associated therewith;

a direct current rail diode connecting said switching bridge and said direct current rail output, said direct current rail diode being faster than said anti-parallel diodes; and an auxiliary circuit connected across said switching bridge for achieving zero-current-transition, said auxiliary circuit comprising:

a resonant capacitor, a resonant inductor and an auxiliary diode connected in series across said direct current rail diode; and an auxiliary switch having a first pole connected between said resonant inductor and said auxiliary diode and a second pole connected to ground.

3. A zero-voltage-transition voltage source inverter for converting a direct current power supply to a three-phase alternating current output, comprising:

a direct current power input;

a switching bridge connected between said direct current power input and said three-phase alternating current output; and an auxiliary circuit connected between said direct current power input and said switching bridge, said auxiliary circuit comprising:
- a rail switch connected to a direct current rail of said direct current power input;
- an auxiliary switch connected in series with a resonant inductor across said rail switch; and
- an auxiliary diode connected at a first end between said auxiliary switch connected and said resonant inductor and at a second end to ground.

4. A zero-current-transition voltage source inverter for converting a direct current power supply to a three-phase alternating current output, comprising:
- a direct current power input;
- a switching bridge connected between said direct current power input and said three-phase alternating current output; and
- an auxiliary circuit connected between said direct current power input and said switching bridge, said auxiliary circuit comprising:
  - a rail switch connected to the direct current rail of said direct current power input;
  - an auxiliary switch connected in series with a resonant inductor and a resonant capacitor across said rail switch; and
  - an auxiliary diode connected at a first end between said auxiliary switch connected and said resonant inductor and at a second end to ground.

5. A bi-directional zero-voltage-transition (ZVT) converter, comprising:
- a direct current power terminal;
- a switching bridge connected between said direct current power terminal and a three-phase alternating current terminal;
- a rail switch connected to the direct current rail of said direct current power terminal;
- an ultra fast diode connected in parallel with said rail switch; and
- an auxiliary circuit connected between said direct current power terminal and said switching bridge, said auxiliary circuit comprising:
  - a first auxiliary switch and anti-parallel diode connected in series with a resonant inductor across said rail switch; and
  - an second auxiliary switch and anti-parallel diode connected at a first end between said first auxiliary switch and said resonant inductor and at a second end to ground, whereby when said rail switch and said first auxiliary switch are open, said converter is a boost rectifier, and if said second auxiliary switch is open, said converter is a voltage source inverter.

6. A bi-directional zero-current-transition (ZCT) converter, comprising:
- a direct current power terminal;
- a switching bridge connected between said direct current power terminal and a three-phase alternating current terminal;
- a rail switch connected to the direct current rail of said direct current power terminal;
- an ultra fast diode connected in parallel with said rail switch; and
- an auxiliary circuit connected between said direct current power terminal and said switching bridge, said auxiliary circuit comprising:
  - a first auxiliary switch and anti-parallel diode connected in series with a resonant inductor and a resonant capacitor across said rail switch; and
  - an second auxiliary switch and anti-parallel diode connected at a first end between said first auxiliary switch and said resonant inductor and at a second end to ground, whereby when said rail switch and said first auxiliary switch are open, said converter is a boost rectifier and if said second auxiliary switch is open, said converter is a voltage source inverter.

\* \* \* \* \*